[72.]

ROBERT E. ROGERS & JAMES BLACK.

Steam Generators.

No. 4,535. Reissued Aug. 29, 1871.

Witnesses
Geo C Lambright
Robert Everett.

Inventors
Robert E. Rogers
James Black
by Atty Thos. T. Everett

THE NORRIS PETERS CO., WASHINGTON, D. C.

UNITED STATES PATENT OFFICE.

ROBERT E. ROGERS AND JAMES BLACK, OF PHILADELPHIA, PENNSYLVANIA.

IMPROVEMENT IN STEAM-GENERATORS.

Specification forming part of Letters Patent No. 65,281, dated May 28, 1867; reissue No. 4,535, dated August 29, 1871.

*To all whom it may concern:*

Be it known that we, ROBERT E. ROGERS and JAMES BLACK, of the city of Philadelphia, in the State of Pennsylvania, have invented certain Improvements in Steam-Generators, of which the following is a specification:

The improvements herein described are modifications of the steam-boiler for which Letters Patent were granted to us, the said ROBERT E. ROGERS and JAMES BLACK, on the 19th day of January, 1864, and were reissued on the 19th day of December, 1865.

Figure 1:
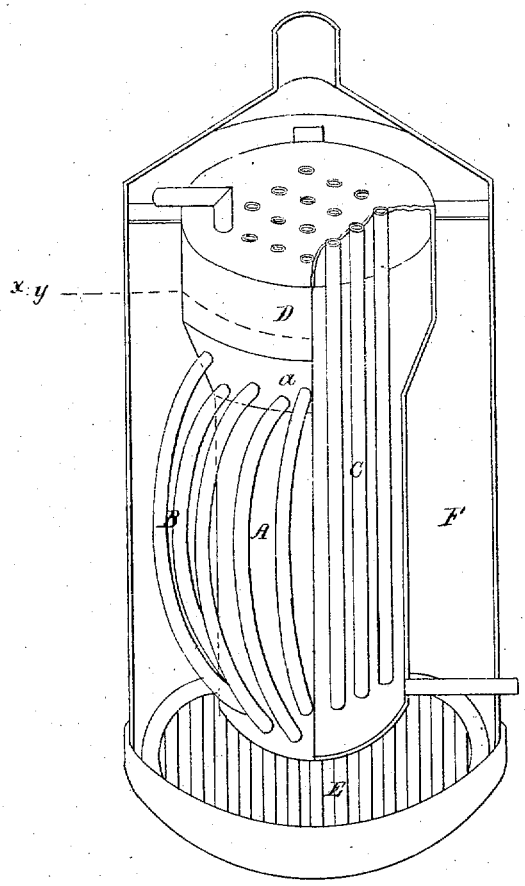
Figure 2:
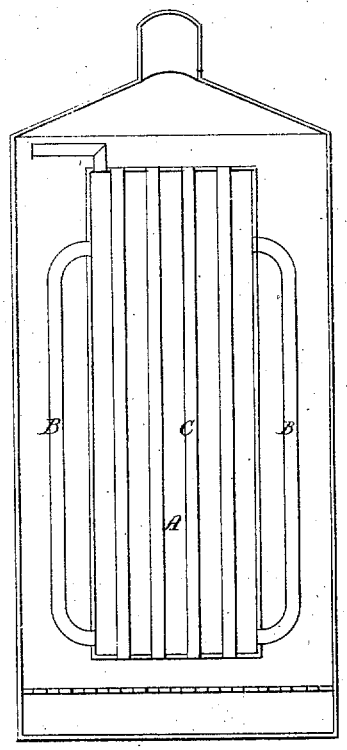

Of the accompanying drawing, Figure 1 is a front view of the boiler with an enlargement at its upper end, showing also the tubes for the circulation of the water—a portion of the boiler and of said enlargement being cut away to show certain interior flue-tubes—the fire-grates, also a vertical section of the fire-chamber in which the boiler is suspended. Fig. 2 is a vertical section of a plain cylinder-boiler, showing the external tubes for the circulation of water, and the internal flue-tubes.

To enable others skilled in the art to make and use said modifications of the original boiler, we will proceed to describe their construction and mode of operation.

In Fig. 1, A is the boiler, having a beveled enlargement, *a*, of its upper portion. B are curved tubes for the circulation of the water. These tubes are connected at the bottom with the body of the boiler A directly, and at top with the beveled enlargement *a*, as shown. C are flue-tubes running vertically through the length of the boiler to act as the tubes in locomotive-boilers for the production of steam. D is a steam-space in the boiler A, above the water-line *x y*. This space may or may not be connected with a supplemental chamber, or steam-drum, in the ordinary manner of connecting steam-drums with boilers. E are fire-grates. F is the fire-chamber, which may be of masonry or of iron, or it may be in a steam-jacket. In this chamber the boiler is shown to be wholly inclosed. This we prefer, but it is evident that to gain good results the extreme upper portion constituting, for the most part, the steam-space above the line *x y* of the boiler need not be so inclosed. And in this case, while a portion of the heated products of combustion pass through the flue-tubes C, the remainder are confined within the fire-chamber to act upon the exterior tubes B, and may be carried off laterally by a flue or pipe leading from the upper end of the fire-chamber.

What we claim as our invention is—

1. The combination of the boiler A with the exterior curved tubes B for the circulation of the water, and the flue-tubes C, in the manner and for the purpose substantially as described.

2. The combination of the boiler A, having the beveled enlargement *a*, with the exterior curved tubes B for the circulation of the water, and the flue-tubes C, in the manner and for the purpose substantially as described.

ROBERT E. ROGERS.
JAMES BLACK.

Witnesses:
WM. P. HIBBERD,
GEORGE W. TAYLOR.